United States Patent
Kelmartin et al.

(10) Patent No.: US 7,163,601 B2
(45) Date of Patent: Jan. 16, 2007

(54) METHOD OF MAKING ARCHITECTURAL FABRIC

(75) Inventors: Thomas Kelmartin, West Chester, PA (US); Suellen Lappe, Elkton, MD (US); William Greene, Wilmington, DE (US); Thomas Wallace, Rising Sun, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 378 days.

(21) Appl. No.: 10/873,964

(22) Filed: Jun. 21, 2004

(65) Prior Publication Data

US 2004/0250942 A1   Dec. 16, 2004

Related U.S. Application Data

(62) Division of application No. 10/003,191, filed on Oct. 29, 2001, now Pat. No. 6,770,577.

(51) Int. Cl.
*B32B 3/26* (2006.01)
*B32B 5/22* (2006.01)
*B32B 5/32* (2006.01)
*B32B 31/06* (2006.01)

(52) U.S. Cl. .................. 156/333; 156/182; 156/308.2; 156/327

(58) Field of Classification Search ............... None
See application file for complete search history.

(56) References Cited

U.S. PATENT DOCUMENTS

| | | | |
|---|---|---|---|
| 4,770,927 A | 9/1988 | Effenberger et al. | 428/245 |
| 4,943,473 A | 7/1990 | Sahatjian et al. | 428/245 |
| 4,946,736 A | 8/1990 | Sassa | 428/245 |
| 5,008,340 A * | 4/1991 | Guerra et al. | 525/193 |
| 5,264,276 A | 11/1993 | McGregor et al. | 428/252 |
| 5,275,887 A | 1/1994 | Johnson et al. | 428/422 |
| 5,357,726 A | 10/1994 | Effenberger et al. | 52/309.7 |
| 5,401,901 A | 3/1995 | Gerry et al. | 174/35 |

(Continued)

FOREIGN PATENT DOCUMENTS

EP   0 202 996   11/1986

(Continued)

*Primary Examiner*—Sam Chuan Yao
(74) *Attorney, Agent, or Firm*—Allan M. Wheatcraft

(57) ABSTRACT

An article having (a) a layer of fabric having a first surface and a second surface made of polytetrafluoroethylene fibers; and (b) a first composite comprising (i) a porous PTFE film having interconnected passages and pathways and (ii) a fluoropolymer adhesive, wherein said fluoropolymer adhesive is at least partially contained in said passages and pathways of said PTFE film, said first composite disposed adjacent to said first surface of said fabric, wherein the article passes a Newark Flex test after 10,000 cycles. In another embodiment, the invention includes a second composite comprising (i) a porous PTFE film having interconnected passages and pathways and (ii) a fluoropolymer adhesive, wherein said fluoropolymer adhesive is at least partially contained in said passages and pathways of said PTFE film, said second composite disposed adjacent to said second surface of said fabric. The article of the present invention is preferably waterproof, fire retardant, and flexible. It is also preferably an architectural fabric for retractable, temporary, or permanent structures and is adapted to be joined to itself by heat welding.

1 Claim, 1 Drawing Sheet

U.S. PATENT DOCUMENTS

Figure 1:
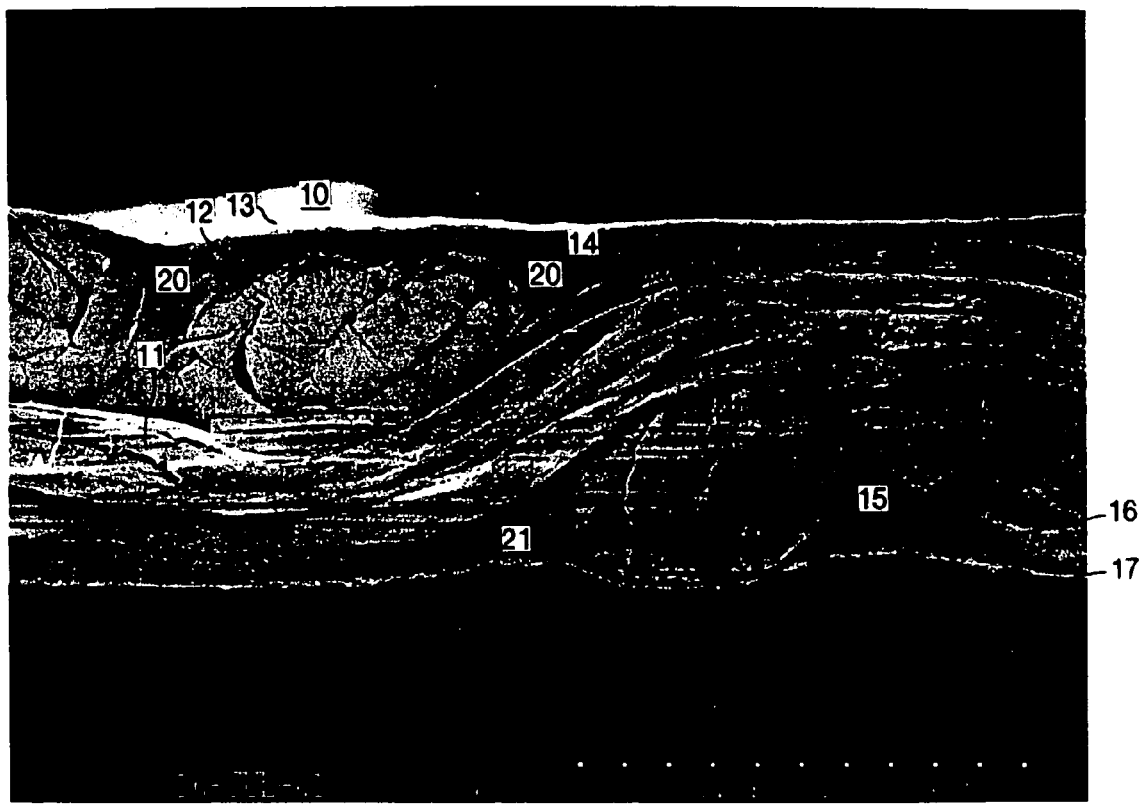

| | | | | |
|---|---|---|---|---|
| 5,433,996 | A | | 7/1995 | Kranzler et al. ............. 428/247 |
| 5,560,974 | A | * | 10/1996 | Langley ....................... 428/198 |
| 5,814,405 | A | | 9/1998 | Branca et al. ......... 428/311.51 |
| 5,916,659 | A | | 6/1999 | Koerber et al. ................ 428/86 |
| 6,517,919 | B1 | | 2/2003 | Griffin ....................... 428/36.1 |

FOREIGN PATENT DOCUMENTS

| | | |
|---|---|---|
| WO | WO 92/09429 | 6/1992 |
| WO | WO 00/2639 | 1/2000 |
| WO | WO 01/96695 | 12/2001 |

* cited by examiner

METHOD OF MAKING ARCHITECTURAL FABRIC

RELATED APPLICATION

This is a divisional of U.S. application Ser. No. 10/003,191 filed on Oct. 29, 2001 now U.S. Pat. No. 6,770,577.

FIELD OF INVENTION

The present invention relates to fabric and, more particularly, to architectural fabric that is waterproof, fire retardant, flexible, durable, and aesthetically pleasing.

BACKGROUND OF INVENTION

Architectural fabric is fabric used as a building structure or part of a building structure. It typically provides protection for humans from elements such as wind, sun, and rain. It may be a permanent structure or a temporary one. If temporary, it may be retractable or removable, for example by folding, rolling, or otherwise storing.

There are several requirements for architectural fabric. It must be strong enough to withstand wind and other stresses during assembly and use. It must be flexible and durable, so that it can be folded or rolled and its strength and integrity are maintained over time. It must be UV light resistant. UV light tends to degrade and weaken fabric over time. A fabric that is UV resistant will stand up under this exposure. It should generally be fire retardant and waterproof. It must also be aesthetically pleasing.

A known architectural fabric is a composite consisting of fiberglass fabric coated with PTFE. Although this product has certain desirable qualities, it is not suitably flexible. The fabric thus cannot be used efficiently in applications where convenient removal of the fabric is needed.

Another known architectural fabric has a coating of PVC or acrylic on polyester fabric. These products have flexibility but only limited durability. Unless specially treated, these fabrics are flammable and tend to degrade under UV light. After a certain amount of flexing and UV exposure, these products develop cracks or other imperfections that allow water to penetrate the fabric at the point where it has been compromised.

An architectural fabric that overcomes the deficiencies of the known products is desirable.

SUMMARY OF INVENTION

The present invention provides an article having (a) a layer of fabric having a first surface and a second surface made of polytetrafluoroethylene fibers; and (b) a first composite comprising (i) a porous PTFE film having interconnected passages and pathways and (ii) a fluoropolymer adhesive, wherein the fluoropolymer adhesive is at least partially contained in the passages and pathways of the PTFE film, the first composite disposed adjacent to the first surface of the fabric. In another embodiment, the invention includes a second composite comprising (i) a porous PTFE film having interconnected passages and pathways and (ii) a fluoropolymer adhesive, wherein said fluoropolymer adhesive is at least partially contained in said passages and pathways of said PTFE film, said second composite disposed adjacent to said second surface of said fabric. The article of the present invention is preferably waterproof, fire retardant, and flexible. Specifically, the article passes a Newark Flex test after 10,000 cycles, after 20,000 cycles, and after 50,000 cycles. It is also preferably an architectural fabric for retractable, temporary, or permanent structures, such as tensile structures, and is adapted to be joined to itself by heat welding.

In another aspect, the present invention provides a method of making an architectural fabric for a retractable, temporary, or permanent structure by:

(a) providing a layer of fabric having a first surface and a second surface and comprising polytetrafluoroethylene fibers;

(b) providing a first layer and a second layer of porous expanded polytetrafluoroethylene membrane;

(c) providing a first layer and a second layer of THV;

(d) laminating the first layer of THV to the first layer of porous expanded polytetrafluoroethylene membrane to form a first THV/membrane composite;

(e) laminating the first THV/membrane composite to the first surface of the fabric;

(f) laminating the second layer of THV to the second layer of porous expanded polytetrafluoroethylene membrane to form a second THV/membrane composite; and (g) laminating the second THV/membrane composite to the second surface of the fabric.

BRIEF DESCRIPTION OF INVENTION

FIG. 1 is a scanning electron micrograph of a cross-section of an article in accordance with an exemplary embodiment of the present invention.

DETAILED DESCRIPTION OF INVENTION

The present invention will now be described with reference to the FIGURE in the drawing. FIG. 1 is a scanning electron micrograph of a cross-section of an article 10 according to an exemplary embodiment of the present invention. In this exemplary embodiment, article 10 is an architectural fabric. Article 10 includes a fabric 11 made of a fluoropolymer material, preferably PTFE fibers that have sufficient strength for a particular application, and most preferably expanded PTFE fibers. Fabric 11 has a warp and a weft direction, accounting for the cross-sectional views perpendicular to and parallel to the axes of the individual fibers of fabric 11 shown in FIG. 1.

Fabric 11 has a first surface 20 and a second surface 21. Disposed adjacent to first surface 20, which extends along the fibers in both the warp and weft direction, is a first composite 14 formed of a fluoropolymer adhesive 12, preferably a terpolymer of tetrafluoroethylene, hexafluoropropylene, and vinylidene fluoride (THV), and porous scaffold 13, preferably made of expanded PTFE. Fluoropolymer adhesive 12 is present in porous scaffold 13.

Article 10 is useful as an architectural fabric with only first surface 20 covered by unitary composite 14. A preferable embodiment, however, also has a second unitary composite 15 disposed adjacent to second surface 21. Second unitary composite 15 is formed of a fluoropolymer adhesive 16, preferably THV, and a porous scaffold 17, preferably made of expanded PTFE. Fluoropolymer adhesive 16 is present in porous scaffold 17.

Fabric 11 is any material that is UV light resistant and fire retardant. It must also be strong, flexible and durable. PTFE fiber is preferred. Fabric made from expanded polytetrafluoroethylene fibers is most preferred.

Fluoropolymer adhesive 12 or 16 is a material that is UV light resistant and fire retardant. THV is preferred. This preferred fluoropolymer adhesive is also advantageously flexible, adherent to the fabric 11 (without being limited by theory, it is believed that the THV is able to encapsulate the fibers of fabric 11 to form a mechanical bond rather than a chemical bond) and clear or translucent. Preferably, the adhesive on both sides of the fabric is the same adhesive.

Scaffold material 13 or 17 is a porous material that is UV light resistant and fire retardant. By "porous" as used herein is meant having interconnected passages and pathways. The scaffold material is preferably expanded polytetrafluoroethylene film having the following properties (test methods for these properties are set forth below): a Frazier Number of 18.0–29.0 cu ft/min/sq ft, a ball burst of greater than 3.4 lbs, and a mass of 5.0–6.0 g/m$^2$. Most preferably, it is expanded PTFE made in accordance with the teachings of U.S. Pat. No. 5,814,405, which is incorporated herein by reference. The preferred film is also strong, flexible, and durable. Fluoropolymer adhesive 12, 16 is contained at least partially in the passages and pathways of porous scaffold 13, 17.

Article 10 made of the preferred materials is surprisingly and unexpectedly durable with the addition of the thin scaffold layer. It also has a surprising aesthetic improvement. When THV alone is used to coat the fabric, the surface has a blotchy appearance that is tacky. With the inventive article, however, the surface appears uniform and is not tacky. This also provides unexpected improvements in processability. The article does not stick to or coat processing rolls during manufacture. Article 10 is also strong, flexible, waterproof, fire retardant, and UV light resistant. These properties make it particularly useful as an outdoor architectural fabric.

Also surprisingly, article 10 can be easily seam-sealed to itself using heat welding techniques known in the art of seam-sealing PTFE/fiberglass fabrics. A secure seam is formed by applying heat (about 200 degrees C.) and pressure to overlapped portions of the inventive fabric. If the pressure used is less than about 50 psi, it is desirable to scuff the mating surfaces of the fabric. A layer of THV or other adhesive is optionally included between the overlapped portions of fabric. A suitable seam sealing device is an automatic wedge welder available from Sinclair Equipment Co., Diamond Springs, Calif., Part No. 33025, called Triad Welder.

The following test methods were used to characterize the present invention.

Test Methods (1) Newark Flex Test

Apparatus:
  Newark Flex Machine
  Fastening Clamps
  Flathead Screwdriver
  Pliers
  1.7" template Test Specimens:
  Specimen size: 3¼"×4½"

Conditioning: Condition specimens at 70±2° F., 65±2% RH prior to testing.

Test Procedure:
1. Center the 1.7" template on the sample, perpendicular to the test direction. Draw two lines to indicate the test area.
2. Turn the motor wheel to ensure that the flex pistons are at maximum extension.
3. Use the template as a gauge to ensure that the distance between the pistons is 1.71".
4. Wrap each specimen around a pair of pistons, face side in, so that the template lines line up with the edges of the pistons.
5. Clamp each specimen above the edges of the pistons using the fastening clamps.
6. Tighten the clamps with a pair of pliers.
7. Ensure that each specimen is smooth and taut.
8. Close the flex enclosure doors.
9. Set the timer to the number of minutes that corresponds to the number of cycles specified in the product specification in the lab database. (Refer to Table below.)
10. Turn the switch on the timer to "Start".
11. Wait until the flex machine has stopped cycling.
12. Loosen the clamps from the specimen with a flathead screwdriver by carefully placing the blade in the space adjacent to where the teeth are engaged and turning gently until the teeth separate. Care should be taken not to damage the specimen.
13. Remove each specimen from the pistons.
14. Condition specimens at 70±2° F., 65±2% RH.
15. Test the specimens for leakage according to the Waterproofness Test described below.
16. Look for leakage in test area only.

Newark Flex Cycles:

| Number of Cycles | Number of Minutes |
| --- | --- |
| 10,000 | 19 |
| 20,000 | 38 |
| 50,000 | 96 |

(2) Wet Flex Test

| Apparatus: | |
| --- | --- |
| AATCC approved Kenmore washer | Thermometer |
| Water hose | Indelible ink pen (Industrial Sharpie) |
| Balance accurate to 0.1 grams | Washer labels |
| Depth marker | |

Test Specimens:
  Specimen size: 8"×8".

Conditioning: N/A

Test Procedure:
1. Preparing Specimens for Wash
  1.1. The number of wash hours is 24.
  1.2. Make sure the samples are 8"×8."
  1.3. Weigh the specimen to the nearest gram.
  1.4. Record the specimen weight.
  1.5. Label the specimen with indelible ink on either the R or Y edge.
  1.6. Enter sample "Start Wash" date and time.
2. Starting a New Washer:
  2.1. Fill the washer with 16±1 gallons of water.
  2.2. Ensure that the temperature is between 23–41° C. (73.4–105.8° F.).
  2.3. Ensure that the agitator is rotating in a circular motion.
  2.4. Distribute the specimens evenly around the agitator.

2.5. Place the cycle setting knob on "Heavy Duty".
2.6. Set the water temperature knob on cold/cold.
2.7. Set a timer located above each washer to the appropriate number of hours (8 hour intervals over a 24-hour period).
2.9. Turn the timer knob to start and pull out the washer cycle setting knob.
2.10. Place a label on the washer with the date in, time in, date out, and time out.
3. Checking a Washer:
   3.1. Turn off the washer at the appropriate interval (every 8 hours for 24 hours).
   3.2. Remove one specimen at a time without squeezing.
   3.3. Hold each specimen up to the light and check for any delamination.
   3.5. Check the water level with appropriate height on the depth marker.
      3.6.1. Add water to adjust the height if necessary.
   3.6. Check the water temperature with a calibrated thermometer to ensure that it's between 23–41° C. (73.4–105.8° F.).
      3.7.1. Drain or add water if necessary to achieve the correct temperature.
   3.7. Check specimen weight per washer, in computer.
      3.8.1. Add either new specimens or ballast to achieve a load of 822–992 grams (29–35 oz), if the total load is less than 822 grams (29 oz).
      3.8.2. Distribute the specimens and ballast evenly around the agitator and restart the washer by pulling out the knob, if the total weight is 822–992 grams (29–35 oz).
4. Record results: "Pass" means no delamination.

(3) Chemical Resistance Test
ASTM F739-96 Permeation Test, with the following modifications and conditions.
Collection Medium Flow Rate: 100
Prior Conditioning: None
Challenge Chemical: Methyl ethyl ketone (obtained from J. T. Baker; concentration 99.6%); or tetrahydrofuran (obtained from E. M. Science; concentration 99.5%).
Test Temp.: 27° C.
Sample Area Exposed ($cm^2$): 5.1
Test Duration: 0.5 Hours
Modifications Of Method: 1" Cells; Closed Loop System
Analytical Technique: Continuous Photoionization
Sampling Frequency: 6 Minutes
Chemical State: Liquid
Type Of Contact: Continuous
Collection Medium: Nitrogen
Min. Detection Limit: 0.1 ppm
Min. Detectable Rate: 0.01 $g/cm^2/min$ (4) Coefficient of Friction Test

| | |
|---|---|
| Equipment Used: | Monitor/Slip Friction Model #32-06 Testing Machines Inc., Amityville, NY |
| Sample Size: | (63 × 63 mm) |
| Sled Weight: | 200 grams |
| Sled Speed: | 250 mm/minute |
| Sled Displacement: | 100 mm |

Procedure:
1. Calibrate load cell following manufacturer's instructions
2. Clean brushed aluminum baseplate with isopropyl alcohol, allow to dry
3. Set sled speed to 250 mm per minute
4. Set displacement to 100 mm
5. Set readout units to "grams"
6. Select 200 gram sled
7. Cut sample and attach to sled with clips or tape as necessary
8. Take care that only sample to be tested contacts baseplate
9. Place sled with attached sample on baseplate and hook to loadcell
10. Press "start" button
11. Sled will start to move, at completion of displacement sled will stop
12. Remove sled and sample
13. Press "enter" to return sled to starting position
14. Record readings from display
15. Leftmost reading is static resistance in grams
16. Rightmost reading is dynamic resistance in grams
17. Repeat so there are 3 readings for each individual sample
18. Clean baseplate with isopropyl alcohol after each sample, allow to dry Calculate coefficient of friction by dividing readings (grams) by sled weight (grams). Report average of 3 readings.

(5) Waterproofness Test

Apparatus:
  RO/Distilled water
  Thermometer
  Low Hydrostatic Pressure Tester (Alfred Suter Co., Ramsey, N.J., Model No. 502 Suter LHPT)
  Timer
  Water Circulator Test Specimens:
  Specimen size: As in Newark Flex Test.
  Specimens per sample: As in Newark Flex Test.

Conditioning: Condition the specimens at 21±1° C. (70±2° F.), 65±2% RH prior to testing.

Test Procedure:
1. Check the water level in the tank.
2. Add water if the level is too low.
3. Turn the pump on.
4. Check that the water temperature is at 27+3° C. (80±5° F.).
   4.1 Run the motor to heat or add heated water to the tank if the water temperature is too low.
   4.2 Float an ice pack, located in the freezer, in the tank to lower the temperature if the water temperature is too high (or becomes too high while testing), or add cold water.
5. Purge the water lines.
6. Place a specimen face side down under the specimen holder.
7. Clamp the specimen in place.
8. Open the valves to start water flow.
9. Set a timer for 3 minutes.
10. Start the timer when the gauge on the LPHT tester reaches the specified pressure (1.1 psig).
11. Check each specimen for leaks. Samples that leak are reported as failures. Those that do not leak, pass.
   11.1 Failures should only be counted if leaks occur in the test area.
      11.1.1 Drops of water penetrating the specimen at the clamped edge of the specimen or within 0.32 cm (⅛") of this edge shall not be counted.

(6) Fire Retardance Test

| Apparatus: | |
|---|---|
| Cabinet including Tirrill Burner | Brass weights |
| Metal specimen holder and clips | Scissors or hole punch |
| Specimen mounting block | Butane lighter |
| Timer (tenths of seconds) | Disposable gloves |
| Metric ruler (1 mm graduations) | Gas: methane 99% pure |
| Plastic bag | |

Test Specimens:
Specimen size: 3"×12" with the 12" length parallel to the test direction. Number of samples: two.

Conditioning: Condition the specimens at 70+2° F., 65±2% RH prior to testing.

Test Procedure:
1. Cut specimens as specified above.
   1.1. Ensure that the gas pressure is 2.5±0.25 psi.
   1.2. Turn power on (control panel on counter).
   1.3. Turn the pilot knob slightly counter-clockwise, so that it is on.
   1.4. Ignite the pilot with the butane lighter.
   1.5. Adjust the pilot size to ⅛" using the pilot knob. Measure the pilot flame from its lowest point to the tip.
   1.6. Set the flame ignition timer to 120 seconds.
   1.7. Turn the flame/fan knob to flame and burn the flame for at least 2 minutes prior to the beginning of each set up and testing session.
   1.9. Adjust the flame height to 1.5" by turning the knob at the bottom of the burner clockwise to increase the height or counter clockwise to decrease the height. The tip of the flame should reach the top point of the flame indicator.
   1.10. Re-set the flame ignition timer to 12 seconds and re-light the flame.
   1.11. Turn the flame/fan knob to fan.
   1.12. Place the metal specimen holder on the mounting block.
   1.13. Align a dummy specimen in the metal holder with the short edge of the dummy aligned with the lower edge of the holder.
   1.14. Close the specimen holder and clamp with the clips at two places on each side making sure the dummy is smooth and flat in the holder.
   1.15. Turn the flame/fan knob to flame.
   1.16. Light the flame with the butane lighter.
   1.17. Immediately turn the flame/fan knob to off.
   1.18. Position the specimen holder securely in the cabinet.
   1.19. Make sure the holder is positioned in the groove of the holder rest at the back of the cabinet and the middle of the lower edge of the specimen is centered ¾" above the burner.
   1.20. Close the cabinet door and the hood sash.
   Note: The specimen must be tested within 2 minutes of being placed in the cabinet.
   1.21. Turn the flame/fan knob to flame to start the 12-second flame.
   1.22. Once the 12-second flame has extinguished confirm that the pilot light is the proper size.
   1.23. Depress the door release button and allow the cabinet to ventilate for 30 seconds or until all smoke and fumes are removed.
   1.24. Adjust the pilot light, if necessary, and repeat steps 1.15 through 1.24 as needed until proper pilot size is maintained.
2. Testing:
   2.1. Place the metal specimen holder on the mounting block.
   2.2. Align the specimen in the metal holder such that the test area does not contain any identification markings when the short edge of the specimen is aligned with the lower edge of the holder.
   2.3. Close the specimen holder and clamp with clips at two places on each side making sure the specimen is smooth and flat in the holder.
   2.4. Turn the flame/fan knob to flame.
   2.5. Light the flame with the butane lighter.
   2.6. Immediately turn the flame/fan knob to off.
   2.7. Position the specimen holder securely in the cabinet.
   2.8. Make sure that the holder is positioned in the groove of the holder rest at the back of the cabinet and that the middle of the lower edge of the specimen is centered ¾" above the burner.
   2.9. Close the cabinet door and the hood.
   Note: The specimens must be tested within 2 minutes of being place in the cabinet.
   2.10. Turn the flame/fan knob to flame to start the 12-second flame.
   2.11. Determine the after-flame, and after-glow time, and the presence of melting or dripping, after the 12-second flame extinguishes, and record in the lab database.
      2.11.1. After-flame: Using the timer mounted on the hood, measure the number of seconds, to the nearest 0.1 seconds, that the material continues to burn after the igniting flame extinguishes. Do not turn the fan on until the specimen has stopped glowing, regardless of whether or not the after-glow is being measured.
      2.11.2. After-glow: Using the automatic timer, measure the number of seconds, to the nearest 0.1 seconds, that the material glows after the flaming ends. The glow shall not be extinguished even if after-glow time is not being evaluated because of the glow's effect on char length.
      2.11.3. Melt/Drip: Look for signs of melting or dripping.

(7) Burst Strength—Ball Burst Test

This test measures the relative strength of a sample of membrane by determining the maximum load at break. A single layer of membrane is challenged with 1 inch diameter ball while being clamped and restrained in a ring of 3 inch inside diameter.

The membrane is placed taut in the ring and pressure applied against it by the steel ball of the ball burst probe. Maximum load is recorded as "Ball Burst" in pounds.

(8) Frazier Number Air Permeability

Air permeability was measured by clamping a test sample in a circular gasketed flanged fixture 5.5 inches in diameter (23.76 square inches in area). The upstream side of the sample fixture was connected to a flow meter in line with a source of dry compressed air. The downstream side of the sample fixture was open to the atmosphere.

Testing was accomplished by applying an air pressure of 0.5 inches of water to the upstream side of the sample and recording the flow rate of air passing through the in-line flow meter (a ball-float rotameter).

Results are reported as Frazier Number which has units of cubic feet/minute/square foot of sample at 0.5 inches of water pressure.

(9) Mass per Area

Five circles of 4.442 inch diameter (100 cm² area) are cut from a representative sample of membrane. The mass for each circle is measured on an analytical balance accurate in grams to three decimal places. Values in grams per 100 square centimeters are converted to grams per square meter by multiplying by 100. Mass per area values were averaged and reported in units of grams per square meter.

fabric was then laminated to the other of the THV/membrane laminates under the same conditions with the THV/membrane laminate against hot roll. The product from this example was then tested using the test methods set forth above. The results are presented in Tables 1–5.

COMPARATIVE EXAMPLE

A sample of Radome RA7906 fabric was obtained from W. L. Gore & Associates, Inc., Elkton, Md. This fabric had a woven ePTFE backing layer coated with a dispersion of FEP and adhered to an ePTFE film, which in turn was adhered to a thermoplastic barrier polymer layer of fluorinated ethylene propylene (FEP), which in turn was adhered to another ePTFE film. This sample was tested for Wet Flex lamination strength and Newark Flex leak resistance. The results are reported in Tables 2 and 3.

TABLE 1

Chemical Resistance Test

|  | Cell 1 | Cell 2 | Cell 3 | Avg. | Std. Dev. |
|---|---|---|---|---|---|
| Test Results With Methyl Ethyl Ketone | | | | | |
| Actual Breakthrough Time (min.) | 2 | 4 | 6 | 4 | 2 |
| Normalized Breakthrough Time (min.) (Using BT criteria of 0.1 μg/cm² * min) | 2 | 4 | 6 | 4 | 2 |
| Breakthrough Detection Time (min.) (using EN 369 BT criteria of 1.0 μg/cm² * min) | 2 | 4 | 6 | 4 | 2 |
| Permeation Rate: μg/cm² * min Steady state rate ✓ Maximum rate | 28 | 27 | 27 | 27 | 1 |
| Unit Area Weight (g/m²) | 661 | 658 | 657 | 659 | 2 |
| Sample Thickness (mils) | 15 | 15 | 15 | 15 | 0 |
| Test Results With Tetrahydrofuran | | | | | |
| Actual Breakthrough Time (min.) | 2 | 4 | 6 | 4 | 2 |
| Normalized Breakthrough Time (min.) (Using BT criteria of 0.1 μg/cm² * min) | 2 | 4 | 6 | 4 | 2 |
| Breakthrough Detection Time (min.) (using EN 369 BT criteria of 1.0 μg/cm² * min) | 2 | 4 | 6 | 4 | 2 |
| Permeation Rate: μg/cm² * min Steady state rate ✓ Maximum rate | 80 | 70 | 82 | 77 | 6 |
| Unit Area Weight (g/m²) | 670 | 668 | 667 | 668 | 2 |
| Saple Thickness (mils) | 15 | 15 | 15 | 15 | 0 |

EXAMPLE

The following non-limiting example is intended to illustrate the present invention.

An expanded PTFE membrane was produced according to the teachings of U.S. Pat. No. 5,814,405 and having the following properties:

| Frazier Number | 22.4 |
|---|---|
| Ball Burst | 4.52 |

This membrane was laminated to a sheet approximately 1.5–2.0 mils thick of THV-220 from Dyneon, Inc. of Oakdale, Minn., using conventional lamination processes involving heat and pressure, to produce a THV/membrane laminate. Two such THV/membrane laminates were produced. Next, a conventional expanded PTFE fabric was obtained from W. L. Gore & Associates, Inc. having the product designation VG0180-HT. This fabric was laminated on one surface to one of the THV/membrane laminates. The lamination was performed by passing the components through one rubber roll and one steel roll heated at about 370 degrees C. (with the fabric against the rubber and the THV/membrane laminate against the hot roll) at about 20 feet per minute. The opposite (unlaminated) surface of the

TABLE 2

Newark Flex Test

| Number of Cycles | Example | Comparative Example |
|---|---|---|
| 10,000 | Pass | Fail |
| 20,000 | Pass | NA (already failed) |
| 50,000 | Pass | NA (already failed) |

TABLE 3

Wet Flex Test

| Number of Hours | Example | Comparative Example |
|---|---|---|
| 8 hours | pass | fail |
| 16 hours | pass | N/A (already failed) |
| 24 hours | pass | N/A (already failed) |

TABLE 4

Coefficient of Friction Test

|  | Static Load (g) | Static Coefficient of Friction | Dynamic Load (g) | Dynamic Coefficient of Friction |
|---|---|---|---|---|
| THV side of THV/membrane laminate | 586 | 2.93 | 338 | 1.69 |
| Membrane side of THV/membrane laminate | 53 | 0.26 | 45 | 0.23 |
| Membrane alone | 33 | 0.16 | 21 | 0.11 |
| THV alone | 530 | 2.65 | 356 | 1.78 |

TABLE 5

Fire Retardance Test

|  | Sample 1 | Sample 2 |
|---|---|---|
| After-flame (sec) | 0.0 | 0.0 |
| After-glow (sec) | 0.0 | 0.1 |

The chemical resistance test data indicates that the article of the present invention is not at all resistant to chemical challenges. Certain chemicals easily penetrate the membranes and fabric. As a result, the article is not suitable or functional as a chemical resistant protective article.

The Newark flex and wet flex test data indicate advantages of the inventive article. After 10,000, 20,000 and 50,000 flexes, the inventive article of the Example still showed no failures resulting in leaks under the test conditions. By comparison, the comparative example leaked after only 10,000 cycles. Even under the wet test conditions, there was no delamination of the inventive article after 24 hours of testing, but the Comparative Example delaminated after only 8 hours. This data indicates the durability and strength of the inventive article, making it particularly advantageous as an architectural fabric.

The coefficient of friction data indicates that the membrane side of the THV/membrane composite has static and dynamic coefficients of friction that are slightly greater than those of membrane alone, but much lower than THV alone or the THV side of the THV/membrane composite. As a result, when this membrane side of the THV/membrane composite is on the outer surface of the inventive article, the article has desirable surface properties: relatively low friction and low tack. Thus, although the membrane has been combined with THV, it still has desirable surface properties. These features are advantageous characteristics of the inventive article, particularly for architectural fabric applications.

The fire retardant data indicates that the inventive article is indeed fire retardant which is extremely advantageous, if not necessary, for architectural fabrics. It was also noted that the inventive article had an aesthetically favorable appearance.

While particular embodiments of the present invention have been illustrated and described herein, the present invention should not be limited to such illustrations and descriptions. It should be apparent that the changes and modifications may be incorporated and embodied as part of the present invention within the scope of the following claims.

What is claimed is:

1. A method of making an architectural fabric for a retractable, temporary, or permanent structure comprising the steps of:
   (a) providing a layer of fabric having a first surface and a second surface and comprising polytetrafluoroethylene fibers;
   (b) providing a first layer and a second layer of porous expanded polytetrafluoroethylene membrane;
   (c) providing a first layer and a second layer of THV;
   (d) laminating said first layer of THV to said first layer of porous expanded polytetrafluoroethylene membrane to form a first THV/membrane composite;
   (b) laminating said first THV/membrane composite to said first surface of said fabric;
   (f) laminating said second layer of THV to said second layer of porous expanded polytetrafluoroethylene membrane to form a second THV/membrane composite; and
   (g) laminating said second THV/membrane composite to said second surface of said fabric.

* * * * *